United States Patent
Razdan et al.

(10) Patent No.: US 9,960,618 B1
(45) Date of Patent: May 1, 2018

(54) PORTABLE DEVICE BATTERY CHARGING CIRCUITS AND METHODS

(71) Applicant: SEAGATE TECHNOLOGY, LLC, Cupertino, CA (US)

(72) Inventors: Ashutosh Razdan, San Jose, CA (US); Philip Yin, Fremont, CA (US); Felix Markhovsky, Saratoga, CA (US)

(73) Assignee: Seagate Technology LLC, Cupertino, CA (US)

( * ) Notice: Subject to any disclaimer, the term of this patent is extended or adjusted under 35 U.S.C. 154(b) by 344 days.

(21) Appl. No.: 14/608,175

(22) Filed: Jan. 28, 2015

Related U.S. Application Data

(60) Provisional application No. 62/091,619, filed on Dec. 14, 2014.

(51) Int. Cl.
*H02J 7/00* (2006.01)

(52) U.S. Cl.
CPC ............ *H02J 7/0052* (2013.01); *H02J 7/007* (2013.01); *H02J 7/0044* (2013.01)

(58) Field of Classification Search
CPC .................................................... H02J 7/0052
USPC .......................................................... 320/107
See application file for complete search history.

(56) References Cited

U.S. PATENT DOCUMENTS

| | | |
|---|---|---|
| 6,507,172 B2 | 1/2003 | Sherman |
| 6,798,173 B2 | 9/2004 | Hsu |
| 6,833,686 B2 | 12/2004 | Veselic et al. |
| 7,782,022 B2 | 8/2010 | Xu et al. |
| 8,049,462 B2 | 11/2011 | Kung et al. |
| 8,395,359 B2 | 3/2013 | Ashida |
| 8,541,984 B2 | 9/2013 | Hsu et al. |
| 8,773,078 B2 | 7/2014 | Yu et al. |
| 2006/0033474 A1 | 2/2006 | Shum |
| 2009/0102429 A1* | 4/2009 | Xu .................... H02J 7/0077 320/162 |
| 2009/0206799 A1 | 8/2009 | Su |
| 2009/0295339 A1 | 12/2009 | Wong |
| 2012/0217935 A1 | 8/2012 | Hawawini et al. |
| 2013/0234666 A1 | 9/2013 | Lei |
| 2013/0249500 A1 | 9/2013 | He |
| 2014/0253051 A1 | 9/2014 | Hu et al. |
| 2014/0306529 A1 | 10/2014 | Yin et al. |
| 2014/0320091 A1 | 10/2014 | Kung |
| 2015/0198989 A1* | 7/2015 | Hayter .................. G06F 1/266 713/340 |

* cited by examiner

*Primary Examiner* — Suresh Memula

(57) ABSTRACT

Devices having battery charge control circuits are disclosed. Such devices can include power control circuits operable to receive electrical power at a connector, and provide power to electrical components, including a charge current for a rechargeable battery; and a controller circuit configured to determine and store a maximum charge current setting based on whether a voltage at the connector falls below a predetermined limit as the charge current is increased. Corresponding methods are also disclosed.

20 Claims, 7 Drawing Sheets

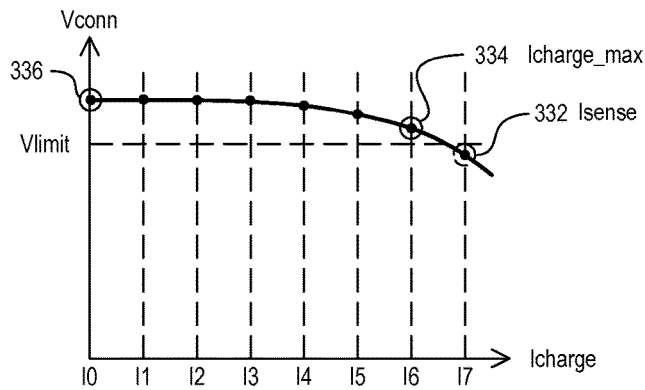
FIG. 3A
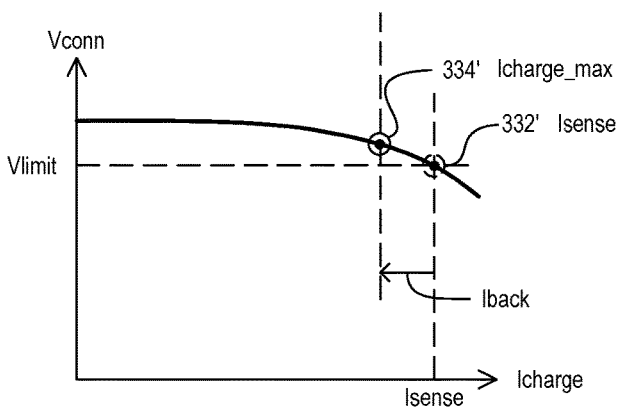
FIG. 3B
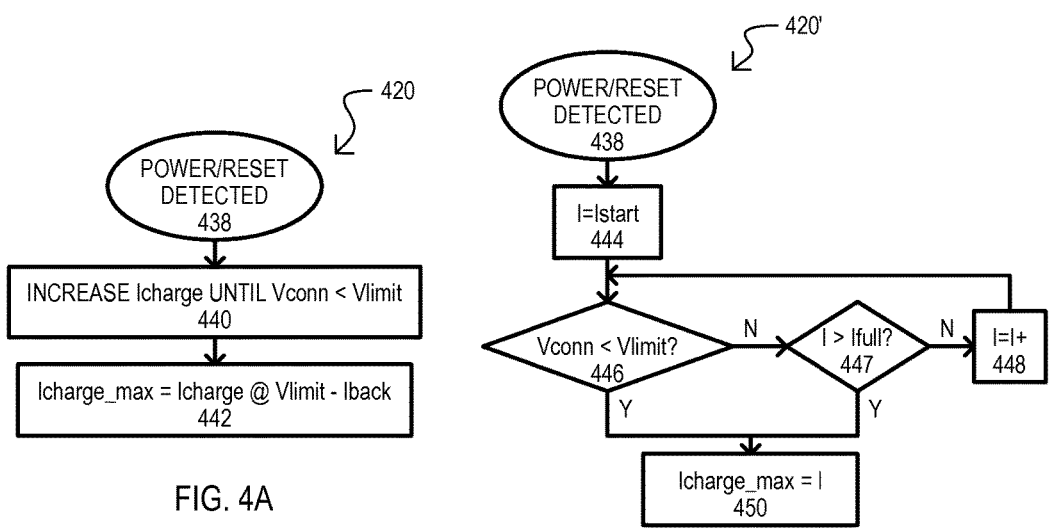
FIG. 4A
FIG. 4B

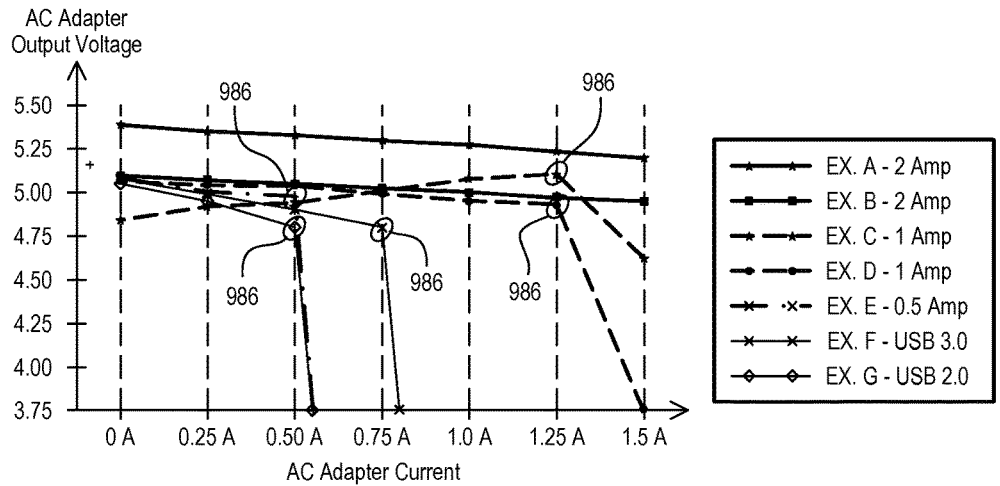

FIG. 9

| Option | Power Adapter Rating @5 V (W) | Power w/ USB 2.0 Cable Drop (W) | Use/Test Case | | | | | | Comments |
|---|---|---|---|---|---|---|---|---|---|
| | | | OFF | Single User Streaming | Single User Download & Play | DAS | Indexing (Creating Database) | SRT (3 Clients) | |
| 1 | 3.5 | 3.255 | Charging (charge time ~4 hours) | Charging (charge time 12 - 14 hours) | Charging (charge time ~5 hours) | Charging (charge time ~10 hours) | Discharging | Discharging | 5V, 0.7A P.S. Adapter |
| 2 | 5 | 4.65 | Charging (charge time ~3 hours) | Charging (charge time ~5 hours) | Charging (charge time ~3 hours) | Charging (charge time ~4 hours) | Neutral | N/A | 5V, 1.0 A P.S. Adapter |
| 3 | 10 | 9.3 | Charging (charge time ~3 hours) | Charging (charge time ~3 hours) | Charging (charge time ~3 hours) | Charging (charge time ~3 hours) | Charging (charge time ~3-4 hours) | Charging (charge time ~3-4 hours) | 5V, 2.0 A P.S. Adapter |

FIG. 10

# PORTABLE DEVICE BATTERY CHARGING CIRCUITS AND METHODS

CROSS REFERENCE TO RELATED APPLICATIONS

This application claims the benefit of U.S. Provisional Patent Application Ser. No. 62/091,619 filed on 14 Dec. 2014, the contents of which are incorporated by reference herein.

TECHNICAL FIELD

The present disclosure relates generally to battery charging circuits for portable devices, and particularly to battery charging circuits that determine a current draw response of power supply source.

BACKGROUND

Portable electronic devices powered by rechargeable batteries are typically shipped with a power supply unit (e.g., AC-DC adapter). The appropriate power supply unit can ensure that a device operates as desired, including (a) providing all the desired functions and (b) recharging in a certain amount of time.

Some conventional portable electronic devices can be charged from a variety of power sources, and so are sold without a power supply unit. However, such devices typically employ a low capacity battery that operates with a correspondingly low charging current limit. As a result, the vast majority of suitable power supply units (i.e., of an appropriate voltage) can be used as battery charging power supplies, as the current draw capacity is so small. Devices powered with such lower capacity batteries can provide certain types of and/or operating times.

In contrast, other portable electronic devices can provide functions having a higher power requirement, and so employ larger capacity batteries with correspondingly higher charging current limits. As but one example, portable data storage devices can often include such battery types. As a result, such conventional devices are typically sold with an appropriate power supply unit (i.e., one that provides a sufficient large charge current). Further such conventional devices can be incapable of operating in all modes with the shipped power supply, as such a power supply may not meet the charge current requirement.

BRIEF DESCRIPTION OF THE DRAWINGS

FIGS. 3A and 3B are graphs showing battery charge current limit determination methods according to particular embodiments.

FIGS. 4A and 4B are flow diagrams showing battery charge current limit determination methods according to particular embodiments.

FIG. 9 is a graph showing how power supply responses can be used to arrive at a charge current limit.

FIG. 10 is a table showing how wireless modes of operation can vary according to power supply.

SUMMARY OF DISCLOSURE

Figure 1:
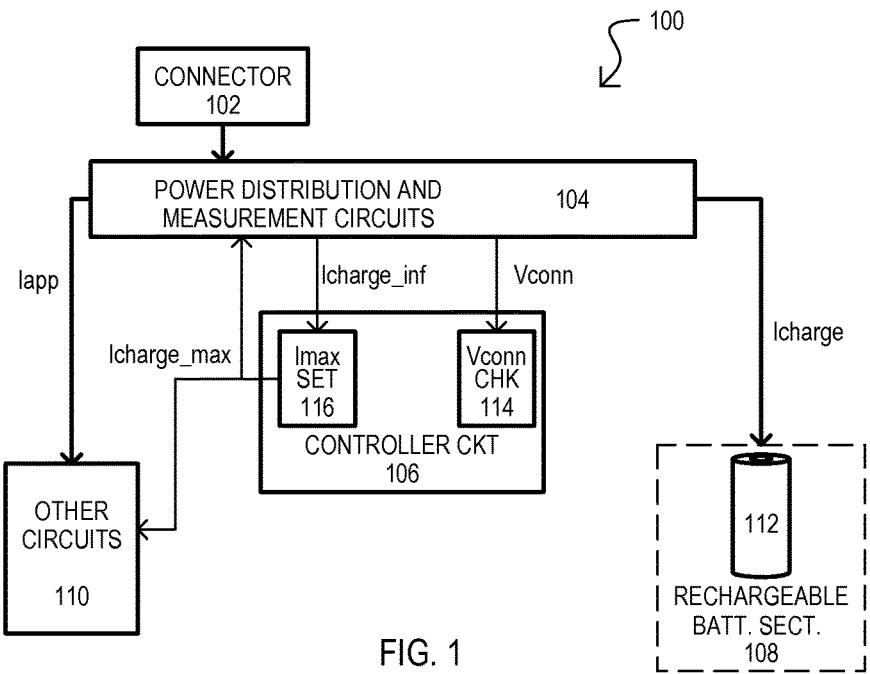
FIG. 1 is a block schematic diagram of a device according to an embodiment.

The present disclosure is directed to devices and methods for portable devices that enable such devices to operate with a wide range of power sources. The current draw response of a power source can be determined, and from such a determination a maximum charge current can be determined and/or functions/modes of operation can be changed.

In particular, a device can include power control circuits operable to receive electrical power at a connection, and provide power to electrical components, including a charge current for a rechargeable battery; and a controller circuit configured to determine and store a maximum charge current setting based on whether a voltage at the connection falls below a predetermined limit as the charge current is increased.

A device can increase a charge current for a rechargeable battery, the charge current sourced from electrical power received at a connection of a portable device. If a voltage at the connection falls below a predetermined value, setting a charge current limit to a charge current less than that corresponding to the voltage drop. If the voltage at the connection does not fall below the predetermined value, setting a charge current limit to a predetermined level. The charge current limit can be stored.

DETAILED DESCRIPTION

Embodiments of the invention can include circuits and methods for portable devices with rechargeable batteries. According to embodiments, circuits can determine a current draw response of a power source attached to the devices, and based on such limits, a desired charge current limit for the battery can be established. In addition or alternatively, functions and/or modes of operation can be enabled or disabled based on the established charge current.

A number of power supplies that can operate with a device can be dramatically increased, as a portable storage device can adjust its charging current according to the power source capabilities. Further, a device can communicate to a user if the power source is capable to charge the battery and/or to supply enough current for the device operation. Embodiments can reduce a charging current from maximum allowable charging current so that battery charging can continue (albeit at a lower rate), while at the same time enabling device functions/modes of operation that would not be feasible at a higher charging current.

In the described embodiments, like items are referred to by the same reference characters, but with the leading digit(s) corresponding to the figure number.

FIG. 1 shows a device 100 according to one embodiment. A device 100 can provide various functions to a user by way of other circuits 110. In a portable mode of operation, a device 100 can operate with power provided by one or more rechargeable batteries 112. In a charging mode of operation, power can be provided by way of connector 102 to charge battery 112 and enable device functions/modes of operation. Unlike some conventional devices, device 100 can be compatible with a wide range of power sources, enabling it to operate with power supplies of different current capabilities.

Device 100 can include a connector 102, power distribution and measurement circuits 104, controller circuits 106, a battery section 108, and other circuits 110. A connector 102 can provide a power supply connection from which device 100 can receive power, including power to charge any batteries 112 and enable one or more functions of the device 100.

In some embodiments, in addition to power, a connector 102 can provide additional input and/or outputs for the device 100. For example, in addition to power, a connector 102 can provide one or more data paths, which can be bi-directional or uni-directional. In some embodiments, a connector 102 can be a standardized connector. Non-limiting examples of possible standard connectors can include: the Universal Serial Bus (USB) standard (any versions); the serial ATA (SATA) standard; IEEE 1394 standard (Firewire); or the Thunderbolt standard.

While some embodiments can include a connector 102 that provides a wired power source connection, in other embodiments, a connector can form part of a wireless charging type power supply.

It is also understood that while embodiments show devices with one connector, alternate embodiments can include multiple connectors of different types, a connector capable of receiving more than one type of physical input (e.g., plug).

Power distribution and measurement circuits 104 can receive power from connector 102 and distribute such power to various sections of the device 100. In the embodiment shown, power distribution and measurement circuits 104 can provide current (Iapp) to other circuits 110 and the charge current (Icharge) to battery section 108. Power distribution and measurement circuits 104 can provide an indication of the voltage at the connector 102 (Vconn) as well as an indication of the magnitude of the charge current (Icharge_inf) to controller circuits 106. In some embodiments, Vconn can be the actual voltage received at the connector 102, while in other embodiments it can be some value representative of such a voltage.

Controller circuits 106 can generate a maximum charge current value (Icharge_max) based on a response of Vconn to certain charge current values. It is understood that a value Icharge_max is not necessarily a maximum possible charge current for a battery 112, but rather a maximum charge current given the current power source's capabilities. More particularly, controller circuits 106 can arrive at Icharge_max based on determining when Vconn drops in a predetermined fashion (e.g., Vconn drops below some limit (Vlimit) as Icharge is increased).

In the embodiment shown, controller circuits 106 can include a voltage check circuit 114 and a current set circuit 116. A voltage check circuit 114 can determine when Vconn is less than Vlimit. Based on such a determination, current set circuit 116 can establish Icharge_max. It is noted that in some embodiments, a voltage check circuit 114 and current set circuit 116 can be digital circuits, including logic and/or one or more processors that execute comparisons on digital values generated from analog-to-digital conversions of Vconn and Icharge. Such processors can execute instructions on a machine readable medium. However, in other embodiments, either or both of voltage check circuit 114/ current set circuit 116 can be analog circuits, providing an analog comparison of Vconn to Vlimit. Controller circuits 106 can output Icharge_max to both power distribution and measurement circuits 104 and other circuits 110.

In response to Icharge_max, power distribution and measurement circuits 104 can limit Icharge to no more than Icharge_max. This can provide a maximum charge current given the capabilities of a power source connected at connector 102. As noted above, this may be below the maximum possible charge current for the battery 112.

In some embodiments, in response to Icharge_max, other circuits 110 can vary their operation. As but one example, according to how large Icharge_max is (relative to the total power supplied at connector 102), one or more functions/ modes of the other circuits 110 can be disabled or altered, as Iapp may not be sufficient for all functions/modes.

Having described the various components of a device 100 according to an embodiment, particular operations of the device will now be described.

In response to power being provided at connector 102, power distribution and measurement circuits 104 can determine Vconn with Icharge set to some initial, minimum value. In some embodiments, such a determination can be made by controller circuits 106 using voltage check circuit 114. An initial Icharge value can be set by some circuit within the device, such as controller circuits 106.

Assuming Vconn remains above a limit (Vlimit) given the initial, minimum Icharge value, Icharge can then be increased and Vconn monitored by controller circuits 106. This can continue until Vconn drops in value. Such a drop in value can be according to any suitable response reflecting a power supply falling below a performance limit. According to some embodiments, a suitable fall in Vconn can include any of: falling below a predetermined voltage; falling at a rate greater than a predetermined rate; or falling a predetermined amount below an initial Vconn, as but a few examples. Voltage check circuit 114 can sense such a drop in Vconn.

In response to the drop in Vconn, current set circuit 116 can establish Icharge_max. In some embodiments, Icharge_max is some value less than that current resulting in detection of the drop in Vconn. Very particular approaches to setting Icharge_max are described in more detail below. Icharge_max can then be provided to power distribution and measurement circuits 104 to serve as a limit for Icharge applied to battery 112, and to other circuits 110 to optionally enable/disable functions according to Icharge_max.

If Vconn is less than Vlimit when power is initially applied (i.e., at the initial minimum (charge value) this can indicate that the power supply is defective or otherwise improper, and the device 100 can give an indication of such (e.g., charging is not occurring, device does not power up, etc.).

Figure 2:
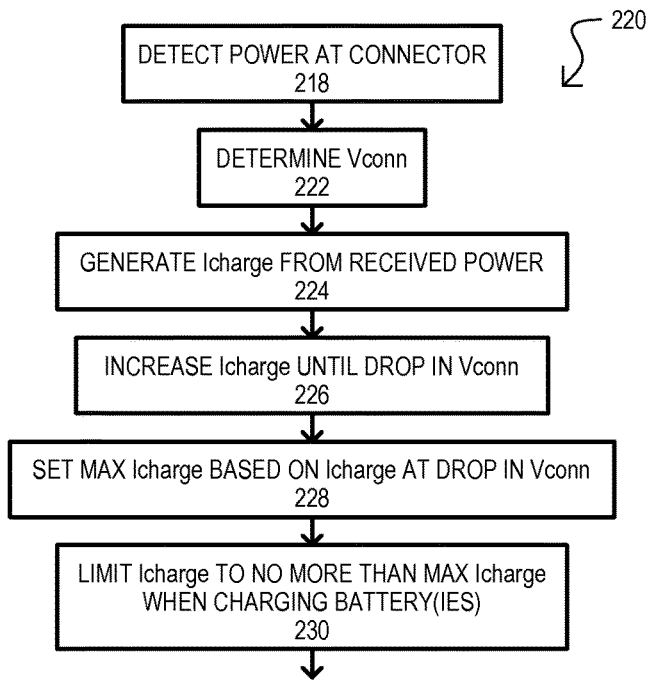
FIG. 2 is a flow diagram of a method according to an embodiment.

FIG. 2 shows a method 220 according to an embodiment. A method 220 can include detecting power at a connector 218. A voltage (Vconn) for the received power can be determined 222. A charging current for a battery ((charge) can be generated from the received power 224.

Icharge can then be increased until a drop in Vconn is detected 226. Such a drop in Vconn can be according to embodiments described herein. A maximum Icharge value can then be determined based on the value of Icharge at the point where the drop in Vconn is detected 228. Icharge can then be limited to no more than the maximum Icharge when charging battery 230.

FIG. 3A is a graph showing the determination of a maximum battery charge current according to one particular embodiment. In FIG. 3A, power is connected to a device. A voltage at the connector can be Vconn. Icharge can be set to some initial, relatively low value (I0) 336. In the embodiment shown, Icharge is increased in discrete steps (i.e., I1 to I2 to I3, etc.) and Vconn compared to a limit value Vlimit at each such current step. The step increases in Icharge can be any suitable steps, and need not be uniform steps. Further, such steps can be large steps, fine steps, or a mix thereof. Such steps in current need not be in the same direction. For example, current steps can converge from two sides of the charge current to arrive at the voltage drop past the limit (Vlimit).

As shown, in the example of FIG. 3A, at Icharge=I7 ((sense), Vconn (332) falls below Vlimit. According to this particular embodiment, a previous Icharge value (I6) can be used as the maximum Icharge value (Icharge_max 334).

FIG. 3B is a graph showing the determination of a maximum battery charge current according to another particular embodiment. In FIG. 3B, Icharge can be set to some initial value, as in FIG. 3A. Icharge is increased and Vconn compared to Vlimit. However, such an increase need not be in discrete steps, and such a comparison can be performed in an analog fashion. In the example of FIG. 3B, at Icharge=Isense, Vconn (332') falls below Vlimit.

According to this particular embodiment, a maximum Icharge value (334') can be arrived at by reducing Isense by a predetermined amount (shown as (back). Such a predetermined amount can vary according to the magnitude of the current at the point where Vconn drops below Vlimit ((sense).

FIG. 4A shows a method 420 according to an embodiment. In one embodiment, method 420 can correspond to the graph shown in FIG. 3B. A method 420 can include a power event being detected (438). In some embodiments, this can include detecting power-on or a reset condition. A battery charge current Icharge can be increased until a voltage at a connector Vconn drops a predetermined amount. This can include any of the voltage drop detection approaches described herein, or equivalents. In FIG. 4A this can include Vconn falling below a value Vlimit (440).

A maximum charge current Icharge_max can be set to the current at the voltage drop, less a predetermined amount (Iback) (442).

FIG. 4B shows a method 420' according to another embodiment. In one embodiment, method 420' can correspond to the graph shown in FIG. 3A. A method 420' can include a power event being detected (438). In some embodiments, this can include detecting power-on or a reset condition. A charge current can be set to an initial value (I=Istart) (444). A voltage at a connector Vconn can be checked for a predetermined voltage drop. In FIG. 4A this can include checking if Vconn falls below a value Vlimit (446).

If Vconn is not below Vlimit (N from 446), a charge current can be checked to see if it has reached (or exceeded) a high current limit ((full) (447). A value Ifull can indicate that a power source can provide all the needed power for all device functions/modes. In some embodiments, this can include a charge current can be set to maximum possible charge current for the battery. If a value Ifull has been reached (Y from 447), a maximum charge current can be set to the current value (450).

If a value Ifull has not been reached (N from 447), Icharge can be incremented by some amount (448), and a method can once again check Vconn (return to 446). As understood from above, current increments in (448) can be uniform or can vary.

If Vconn falls below Vlimit (Y from 446), a maximum charge current can be set to the current value (450) (i.e., the current magnitude just preceding the drop in Vconn).

Figure 5:
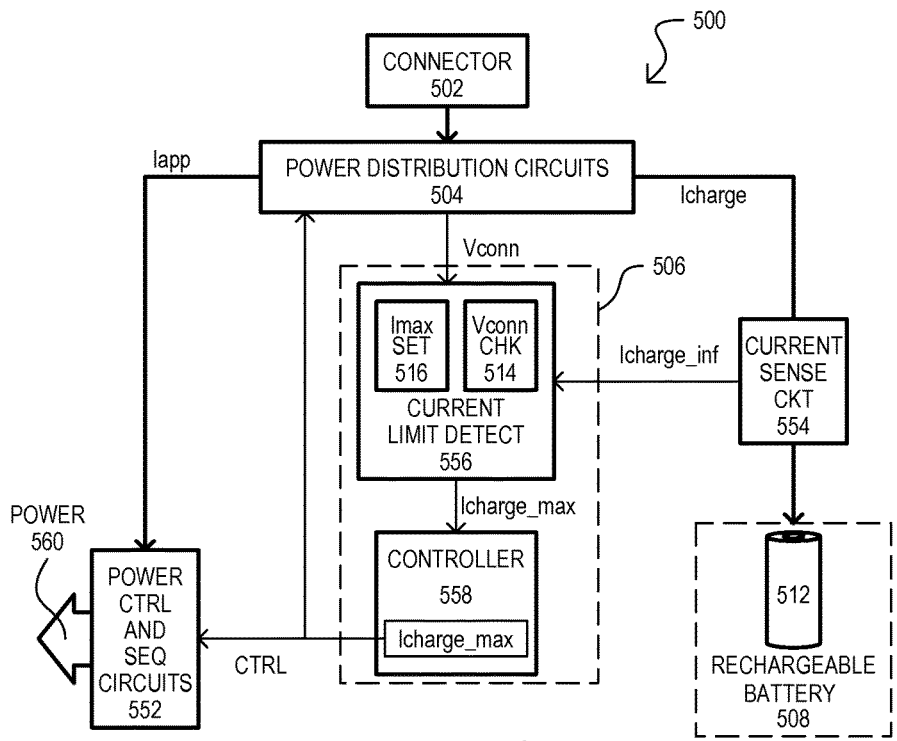
FIG. 5 is a block schematic diagram of a device according to another embodiment.

FIG. 5 shows a device 500 according to another embodiment. Device 500 can include a connector 502, power distribution circuits 504, controller circuits 506, a battery section 508, current sense circuit 554, and power control and sequencing circuits 552.

A connector 502 and power distribution circuits 504 can provide the functions and be subject to the same variations as those shown as 102 and 104 in FIG. 1.

Current sense circuit 554 can sense a magnitude of a battery charge current (Icharge) and provide such information (Icharge_inf) to controller circuits 506.

Controller circuits 506 can include a current limit detect section 556 and controller unit 558. Current limit detect section 516 can include a voltage check circuit 514 and current set circuit 556 which can operate as described for other embodiments herein, or equivalents. In response to a connector voltage value (Vconn) and Icharge_inf, a maximum charge current (Icharge_max) can be determined. Such a value can be provided to controller unit 558.

A controller unit 558 can include processor circuits for executing instructions for controlling various operations of the device, including those based on a maximum charge current (Icharge_max). Such instructions can be formed in a machine readable medium. In the embodiment shown, controller unit 558 can store a value Icharge_max. Using such a value, controller unit 558 can generate control signals CTRL for power control and sequencing circuits 552. Control signals CTRL can vary according to a value of Icharge_max. In one embodiment, a controller unit 558 can be implemented as part of a microcontroller circuit.

In response to control signals CTRL, power control and sequencing circuits 552 can control how power 560 is applied to various sections of the device 500. Accordingly, power 560 can include various paths of varying voltages and currents, as well as circuits for applying such voltages/currents in particular sequences and/or according to particular modes. The modes and/or sequencing can vary according to the value Icharge_max.

In response to control signals CTRL, power distribution circuits 504 can limit Icharge to no more than Icharge_max when charging battery 512.

Figure 6:
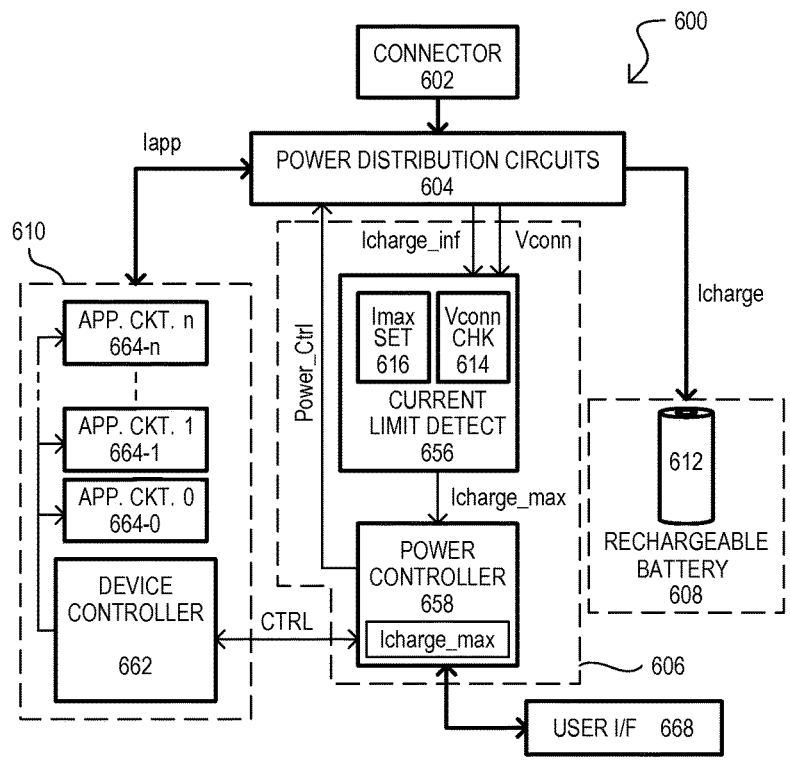
FIG. 6 is a block schematic diagram of a device according to a further embodiment.

FIG. 6 shows a device according to another embodiment. Device 600 can include items like those of FIGS. 1 and 5, including a connector 602, power distribution circuits 604, controller circuits 606, a battery section 608, and other circuits 610. Such like items can provide the functions and be subject to the same variations as those shown in FIGS. 1 and 5. In addition, FIG. 6 shows a user interface 668.

In FIG. 6, other circuits 610 are shown to include a device controller circuit 662 along with a number of application circuits 664-0 to 664-n. Application circuits (664-0 to 664-n) can provide various functions of the device 600. Such application circuits (664-0 to 664-n) can include, but are not limited to: controller circuits for data storage of any suitable media type, including solid-state storage and/or disk drive storage; wireless communication circuits for various standards, including "Wi-Fi" or closer range communications, such as Bluetooth; display driver circuits; processors, including application specific processors, such as graphic processors or baseband processors; interface circuits, including human interface devices and/or touch surfaces; or image capture circuits. Various other circuits can be included according to the type of device 600.

In response to a maximum charge current value (Icharge_max), device controller circuit 662 can selectively enable or disable the various application circuits (664-0 to 664-n) to enable or disable functions provided by the device 600 in the event there is insufficient power for all functions (or desired performance of such functions). More particularly, in some embodiments, device controller circuit 662 can determine power received at connector 602, receive a maximum charge current value Icharge_max, and based on a priority of functions, enable or disable various application circuits (664-0 to 664-n). However, in other embodiments, which application circuits (664-0 to 664-n) are enabled and disabled can be based solely on Icharge_max and Vconn. Such enabling/disabling of application circuit functions (664-0 to 664-n) can result in different modes of operation for the device 600.

In particular embodiments, functions provided by application circuits (664-0 to 664-n) can have a priority with respect to one another. Such a priority can be set by a factory setting and/or a user setting. A device controller (664-0 to 664-n) can disable applications circuits (664-0 to 664-n) based on such a priority, disabling lower priority functions.

User interface 668 can be controlled by controller circuits 606 to provide inputs and/or outputs for a user of the device 600. In some embodiments, such outputs can indicate functions of the device 600. In particular embodiments, user interface 668 can indicate any of: functions that are currently enabled (or disabled); a battery charge status, including if the battery is charging, current amount of charge, time to full charge, etc.; power status (running on battery or plugged in); communication status (connected to a network or communicating with some other device); or mode(s) of operation. It is understood that these indications are exemplary.

In some embodiments, user interface 668 can be formed all, or in part, in the device 600 itself. For example, user interface portions can include visual indicators (i.e., LEDs, displays, etc.), audio indicators, input switches (buttons, touch inputs) formed as portions of the device. However, in other embodiments, a user interface can be formed all, or in part, on a second device. As but one example, such an interface can reside on another device (i.e., device 600 is controlled/monitored via an application running on the second device, for example a mobile phone app or web browser).

Figure 7:
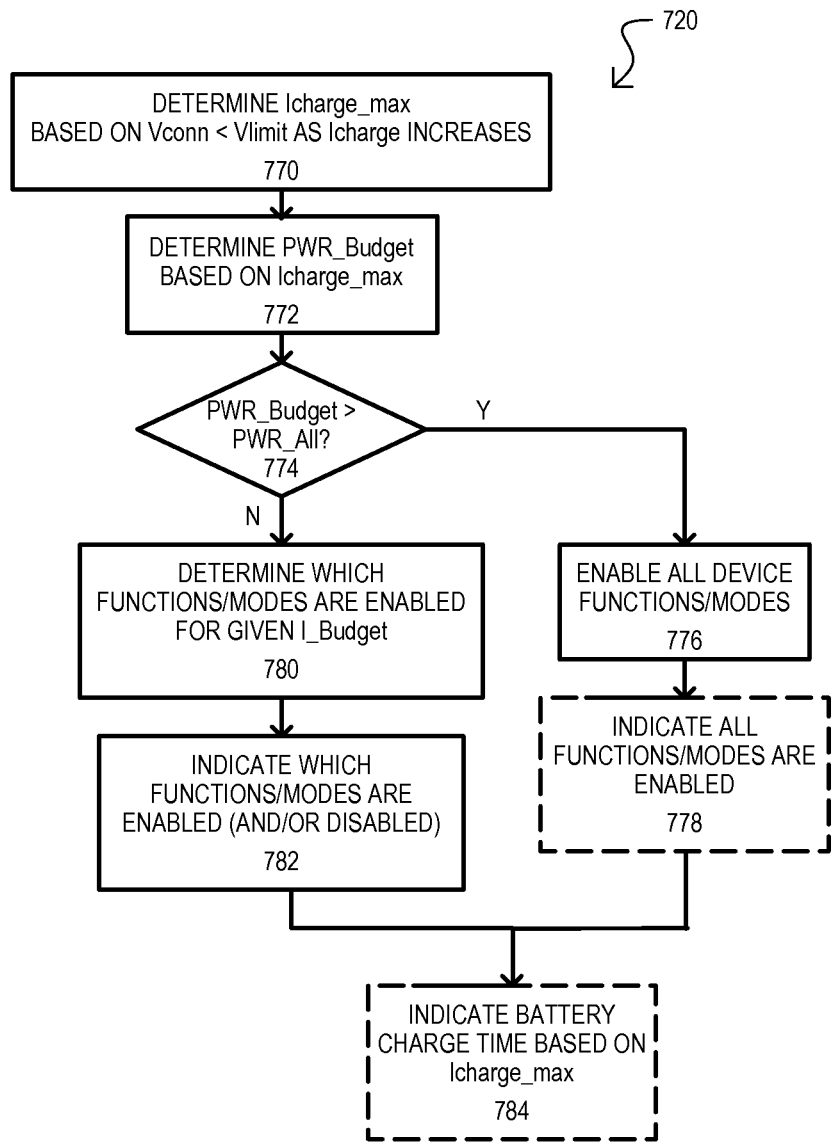
FIG. 7 is a flow diagram of a method according to another embodiment.

FIG. 7 shows a method 720 according to a particular embodiment. A method 720 can include determining a maximum battery charging current (Icharge_max) based on a drop in a power supply connector voltage (Vconn) as the charging current is increased (770). While box 770 shows Vconn<Vlimit, such an action can include any of those described herein or equivalents.

A method 700 can determine a power budget (PWR_Budget) based on Icharge_max (772). Such an action can include determining how much power is available from a given power source, given the Icharge_max value. However, in other embodiments, such a determination can be made solely on Icharge_max and Vconn.

A method 700 can determine if PWR_Budget is greater than an "all functions" power requirement (PWR_all) (774). PWR_all can be a power level that can enable all functions of a device. That is, the power source at the connector can charge a battery with a maximum allowable current and still have enough power for all functions of the device.

If PWR_Budget>PWR_all, then all functions of the device can be enabled (776). In some embodiments, a method 720 can also include providing indication(s) that all functions/modes of operation are enabled (778).

If PWR_Budget is not greater than PWR_all, then a determination can be made as to which functions/modes will be disabled (780). In some embodiments, functions/modes can have a predetermined priority and power budget, and an action 780 can enable/disable such functions/modes based on such a priority. Such priority can be static (never changes), or can vary according to user preference or mode of operation. Such an action can also include changing the performance of functions.

In some embodiments, a method 720 can also give an indication of a charge time and/or rate given the current Icharge_max value (784).

Figure 8:
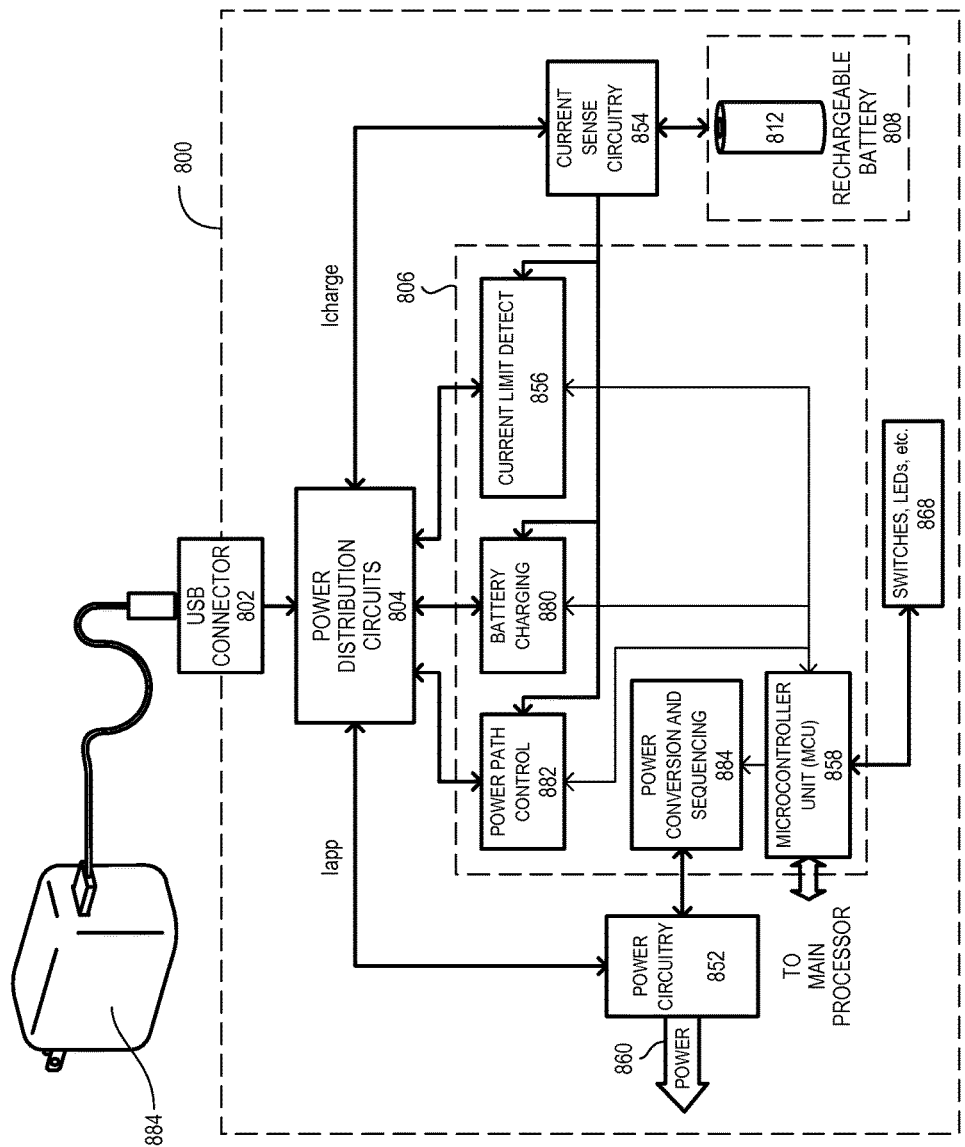
FIG. 8 is a block schematic diagram of a portable storage device according to a particular embodiment.

FIG. 8 shows a device 800 according to another embodiment. Device 800 can be a battery powered portable storage device that includes a microcontroller section 806 for supervising battery charging and power generation and controlling various other functions of the device 800. Microcontroller section 806 can be connected to a main (system) processor (not shown) and, in addition, may also control a human interface 868.

In FIG. 8, functions of a microcontroller section 806 are depicted by power path control section 882, battery charging section 880, current limit detect section 856, power conversion and sequencing section 884, and microcontroller unit (MCU) 858. Circuits external to the microcontroller section 806 can include power distribution circuits 804, current sense circuit 854, and power circuitry 852.

In the particular embodiment shown, power can be received from an external power source 884 at a USB compatible connector 802.

In one embodiment, current limit detect section 856 can operate as follows:
1. Detect the power from an external power source (on the USB connector 802).
2. Monitor the voltage value from the external power source (at the USB connector 802), while increasing battery charge current (Icharge) up to maximum allowable limit. For example, such a limit can include two amperes, in one particular embodiment.
3. When the voltage value from the external power source drops dramatically, e.g., creating a "knee" of the voltage vs. current curve (for example, see FIG. 9), the current limit detect section 856 can stop the process of increasing the battery current and can retrieve a maximum allowable current for the attached external power source from a look up table that is stored in a memory of the MCU. That is, MCU can track increases in Icharge that the resulting voltage response at the connector 802.
   a. If the battery charging current is at the maximum limit and the "knee" is not reached, the process can be stopped and will estimate that the external power source capability to be equal to this maximum charging current limit for the device.
   b. In some embodiments, the look up table can quantize the maximum allowable current value for the external power source. In one particular example, such quantization can include 0.5 A, 0.7 A, 1 A or 2 A.
4. Thereafter, current limit detect circuit 856 can communicate the external power source current draw limit value (from the table) to the system (MCU 858 and the main processor). As a result, this current limit value can be used to set the battery charging current and/or determine which modes of operations are allowable (for example, see FIG. 10), and provide user feedback regarding such modes.
5. In some embodiments, the external power source current draw limit, noted in section 3 above, can persist until current limit detect section 856 detects the loss of the external power (for example removal of the USB cable).

Referring still to FIG. 8, in some embodiments, power distribution circuits 804 and current sense circuit 854 can provide the functions and be subject to the same variations as those shown as 504 and 554 in FIG. 5.

Power path control section 882 can control how power is passed onto various sections of the device 800. Battery charging section 880 can control how Icharge is applied to battery 812. In particular, battery charging section 880 can ensure that Icharge does not exceed the maximum draw limit derived with current limit detect section 856.

Power conversion and sequencing circuit 884 can control power circuits 852 to produce the desired power 860 for various sections of the device 800, as well the sequence by which such power is applied. In some embodiments, this can include DC-DC conversions to lower and/or higher voltages according to the circuit components of the device.

MCU 858 can include one or more processors for executing instructions, stored on a machine readable medium, to enable the various functions of microcontroller section 806. MCU 858 can include memory both volatile and nonvolatile to store various values, including the voltage/current table noted above that is used to arrive at a maximum charge current.

User interface 868 can be controlled by MCU 858. A user interface 868 can include switches and LEDs, but can also include any of the user interface items/features disclosed for the other embodiments herein, or equivalents.

In particular embodiments, external power source 884 can be an AC-DC converter. However, in other embodiments, an external power source can be a port on another device. As but one example, external power source 884 can be a USB port on a computer, or the like.

FIG. 9 is graph showing a response for various AC-DC adapters (EX. A to EX G.). The adapters include AC adapters of various DC amperage ratings (i.e., 2 amp, 1 amp, 0.5 amp), as well as USB supplies (i.e., USB 3.0, 2.0).

As shown, various of the adapters can have the "knee" response noted above, exhibiting a large drop in voltage given the charge current increase. The start of such dropping points are shown by 986 for some of the responses. Based on the knee position, a maximum charge current can be determined (e.g., the current sample just prior to the knee, or some offset from the knee, etc.).

FIG. 10 is a table showing how various functions of a wireless storage device that can vary based on a mode of operation. The table shows three options: (1) a 5V, 0.7 A adapter, (2) a 5V, 1.0A adapter, and (3) a 5V, 2.0 A adapter. The table includes the following columns for each option: power adapter rating and a power a drop from a USB cable (i.e., power at the USB connector).

In addition, FIG. 10 shows a device response in various modes. In particular, the table shows how battery charging can vary according to mode. The following columns are presented: "OFF" shows the response with the functions of the device turned off; "Single User Streaming" shows the response as the device streams data to one user wirelessly; "Single User Download and Play" shows a response when data is downloaded and streamed to a user; "DAS" shows a response when the device operates as direct attached storage; "Indexing" shows a response as the device organizes its various data files; and "SRT" shows the device operating as a shared resource for multiple users (in this case three users).

From the above it is understood that modes can affect charging capability. From such data, some modes can be disabled to ensure some sort of battery charging can occur.

Figure 11:
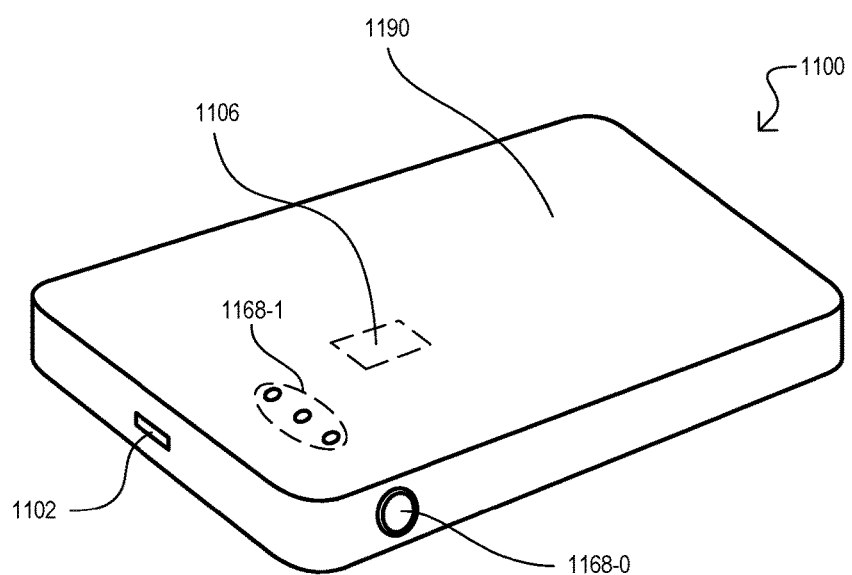
FIG. 11 is a perspective view of a portable storage device according to one very particular embodiment.

While embodiments can include various device types, a particular embodiment is shown by way of example in FIG. 11. The device 1100 of FIG. 11 can be one very particular implementation of that shown in FIG. 8. Device 1100 can be portable wireless storage device that can include storage in the form of solid state storage, one or more disk drives, or combinations thereof.

Components of device 1100 can be included within a housing 1190, including controller circuits according to the various embodiments shown in FIG. 8. One or more switches (e.g., 1168-0) can control the operation of the device, including powering the device on. Indicators (e.g., 1168-1) can indicate to a user functions of the device 1100. Connector 1102 can provide a power connection for the device.

In particular embodiments, a connector 1102 can be a standardized connector (e.g., USB). However, unlike some conventional devices, device 1100 can include controller circuits 1106 with current limit detection and setting circuits as described herein, or equivalents, and thus can accommodate power supplies of various ratings. As such, a device 1100 is compatible with a wide range of power supplies, including those used for other devices.

Consequently, a device 1100 can be sold without a power supply, as it can be connected to various other devices/supplies to receive power and charge its battery.

It is understood that while particular portable devices can been described herein, other embodiments include any of various portable devices that can be powered by a rechargeable battery, including but not limited to: a cellular phone; a mobile phone; a smart phone; a digital camera; a portable storage device (including one with a hard drive, solid state drive, or combination thereof), a Wi-Fi enabled device (including a storage device); a tablet; a laptop; and a portable media player.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory, such as main memory. Transmission media can include coaxial cables, copper wire and fiber optics. Transmission media can also take the form of acoustic or light waves, such as those generated during radio wave and infrared data communications.

Common forms of computer-readable media include, for example, a flexible disk, hard disk, hard drive, magnetic tape, or any other magnetic medium, a CD-ROM, any other optical medium a RAM, a PROM, and EPROM, a FLASH-EPROM, any other memory chip or cartridge, a carrier wave as described hereinafter, or any other medium from which a computer can read.

References were made in detail to embodiments, examples of which were illustrated in the accompanying drawings. While the embodiments were described in conjunction with the drawings, it is understood that they were not intended to limit the embodiments. On the contrary, the embodiments are intended to cover alternatives, modifications and equivalents. Furthermore, in the detailed description, numerous specific details were set forth in order to provide a thorough understanding. However, it is recognized by one of ordinary skill in the art that the embodiments may be practiced without these specific details. In other instances, well-known methods, procedures, components, and circuits have not been described in detail as not to unnecessarily obscure aspects of the embodiments.

It is also understood that the embodiments of the invention may be practiced in the absence of an element and/or step not specifically disclosed. That is, an inventive feature of the invention can be elimination of an element.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The implementations described above and other implementations are within the scope of the following claims.

What is claimed is:

1. An apparatus, comprising:
    power control circuits operable to receive electrical power at a connector, and provide power to electrical components, including a charge current for a rechargeable battery; and
    a controller circuit configured to determine and store a maximum charge current setting at which battery charging continues based on whether a voltage at the connector falls below a predetermined limit as the charge current is increased.

2. The apparatus of claim 1, wherein the connector is a wired connector.

3. The apparatus of claim 2, wherein the connector is configured to provide a power supply and at least one serial data path.

4. The apparatus of claim 1, wherein the connector is selected from: a Universal Serial Bus connector; an IEEE 1394 (Firewire) connector; a Serial ATA (SATA) connector, a connector compatible with the Thunderbolt standard; and a connector compatible with a wireless power transfer system.

5. The apparatus of claim 1, wherein the electrical power received at the connector is DC power.

6. The apparatus of claim 1, wherein:
    the connector receives a DC input supply voltage; and
    the controller circuit comprises a current limit detection circuit configured to sense the charge current and determine when the DC input supply voltage falls below a voltage limit.

7. The apparatus of claim 1, wherein:
    the controller circuit further includes
        a current sensing circuit coupled to a charge current path to a battery,
        a voltage compare circuit configured to compare an input supply voltage to the voltage limit, and
        a store for storing a charge current value corresponding to input supply voltage levels.

8. The apparatus of claim 1, wherein:
    the controller circuit comprises a microcontroller.

9. The apparatus of claim 1, further including:
    a plurality of application circuits configured to provide functions of the apparatus, the application circuits having a priority with respect to one another; and
    a device controller configured to disable some application circuits based on the priority in response to the maximum charge current setting being below a predetermined current limit.

10. The apparatus of claim 9, further including:
    a user interface comprising at least one indicator configured to identify when at least one function is disabled by the device controller disabling a corresponding application circuit.

11. The apparatus of claim 1, wherein:
    the apparatus is a portable storage device comprising data storage circuits and wireless communication circuits configured to enable access to data stored in the data storage circuits.

12. An apparatus, comprising:
    power control circuits operable to receive electrical power at a connector, and provide power to electrical components, including a charge current for a rechargeable battery;
    a controller circuit configured to determine and store a maximum charge current setting at which battery charging continues based on whether a voltage at the connector falls below a predetermined limit as the charge current is increased; and
    a device controller circuit configured to disable selected functions of the apparatus according to the maximum charge current settings.

13. The apparatus of claim 12, wherein:
    the controller circuit includes a storage section, and the controller circuit is configured to store the maximum charge current setting.

14. The apparatus of claim 13, wherein:
    the device controller is configured to receive the maximum charge current setting from the controller circuit.

15. The apparatus of claim 12, wherein:
    the apparatus is a portable storage device comprising data storage circuits and wireless communication circuits configured to enable access to data stored in the storage circuits.

16. An apparatus, comprising:
    power control circuits operable to receive electrical power at a connector, and provide power to electrical components, including a charge current for a rechargeable battery;
    a controller circuit configured to determine and store a maximum charge current setting based on whether a voltage at the connector falls below a predetermined limit as the charge current is increased;
    a plurality of application circuits configured to provide functions of the apparatus, the application circuits having a priority with respect to one another; and
    a device controller configured to disable some application circuits based on the priority in response to the maximum charge current setting being below a predetermined current limit.

17. The apparatus of claim 16, further including:
    a user interface comprising at least one indicator configured to identify when at least one function is disabled by the device controller disabling a corresponding application circuit.

18. The apparatus of claim 16, wherein:
    the connector receives a DC input supply voltage; and
    the controller circuit comprises a current limit detection circuit configured to sense the charge current and determine when the DC input supply voltage falls below a voltage limit.

19. The apparatus of claim 16, wherein:
    the controller circuit further includes
        a current sensing circuit coupled to a charge current path to a battery,
        a voltage compare circuit configured to compare the input supply voltage to the voltage limit, and
        a store for storing a charge current value corresponding to input supply voltage levels.

20. The apparatus of claim 16, wherein:
the apparatus is a portable storage device comprising data storage circuits and wireless communication circuits configured to enable access to data stored in the data storage circuits.

\* \* \* \* \*